A. H. RINGEN.
TIRE CHAIN FASTENER.
APPLICATION FILED SEPT. 25, 1919.
1,369,546.
Patented Feb. 22, 1921.
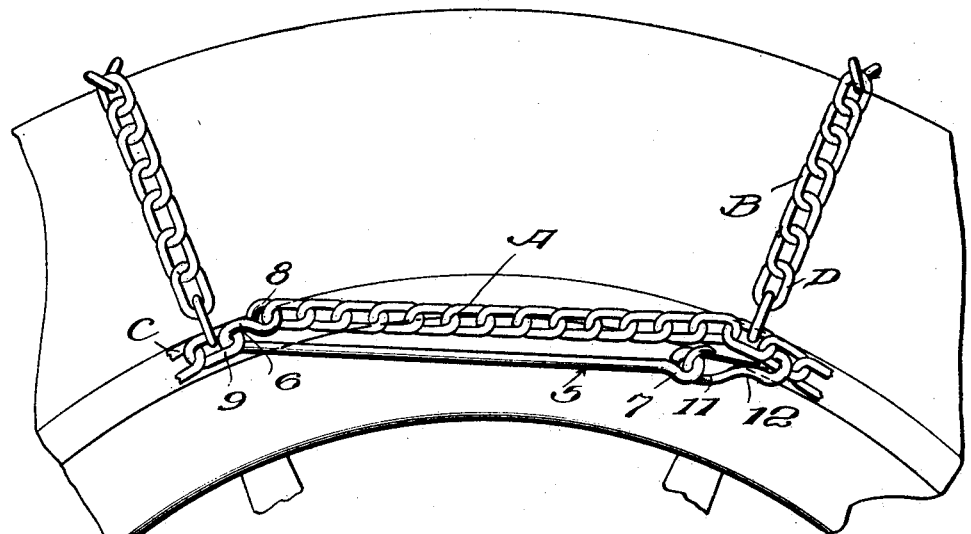
Fig. 1.
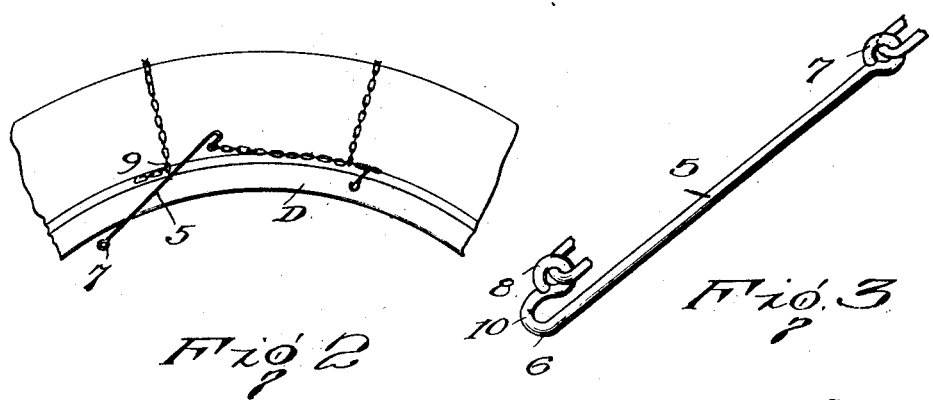
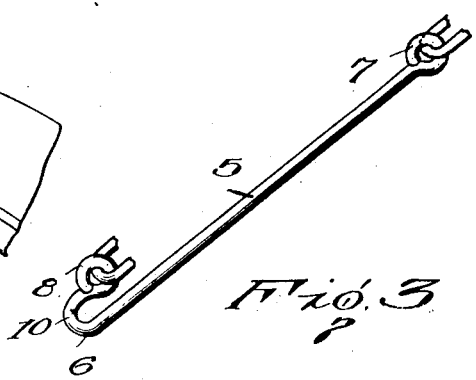
Inventor
August H. Ringen

UNITED STATES PATENT OFFICE.

AUGUST H. RINGEN, OF SWEET SPRINGS, MISSOURI.

TIRE-CHAIN FASTENER.

1,369,546.  Specification of Letters Patent.  Patented Feb. 22, 1921.

Application filed September 25, 1919. Serial No. 326,230.

*To all whom it may concern:*

Be it known that I, AUGUST H. RINGEN, a citizen of the United States, residing at Sweet Springs, in the county of Saline and State of Missouri, have invented certain new and useful Improvements in Tire-Chain Fasteners, of which the following is a specification.

This invention relates to a fastener for use in fastening anti-skid chains about pneumatic tires of motor vehicles and an object of the invention is to provide a fastener for this purpose which will prevent the loss of the chain during travel of the wheels of the vehicle upon which they are mounted.

Considerable difficulty is experienced with the present type of fasteners employed in fastening anti-skid chains upon the pneumatic tires of motor vehicles, in both the proper fastening thereof and in the loss of the tire chains owing to the fastening devices becoming unfastened during the travel of the vehicle wheel because of the inability to properly tighten the chains about the tire when applying them.

It is an object of this invention to provide a fastener for anti-skid chains which will securely connect the ends of the chains so as to prevent accidental disconnection thereof and the consequent loss of the chain and which will also cause the chain to be tightly bound about the tire when the connection of the ends thereof is made.

More specifically, the invention comprehends the provision of a fastener as specified, which comprises a relatively long bar having a substantially S-shaped head at one end adapted to engage through the end link of the side chains of an anti-skid chain of approved construction, and an eye at the opposite end adapted to receive therethrough a hook of a snap hook structure which is carried by one of the side chains for preventing accidental disconnection, of the fastener, which fastener is first coupled into the desired link of one of the side chains and passed through the end links of the same side chain, at the opposite end thereof, the said links acting as a fulcrum for pivotal movement of the fastener, which stretches the chain securely about the tire, after which the fastener is bent back along the rim or tire of the vehicle wheel, causing the end link which has previously acted as a fulcrum to seat in the crook formed at the junction of the S-shaped hook and the body of the fastener, when the eye of the fastener is engaged by the snap hook, thereby securely attaching the meeting ends of the anti-skid chain and holding it in place upon the tire against accidental loss or removal from the tire.

Other objects of the invention will appear in the following detailed description taken in connection with the accompanying drawings, forming a part of this specification, and in which drawings:

Figure 1 is a side elevation of the improved fastener showing the same applied to a tire chain mounted upon a vehicle wheel.

Fig. 2 is a reduced side elevation of the fastener showing it in one position during the connecting of the ends of an anti-skid chain mounted upon a tire, and Fig. 3 is a detail perspective view of the improved fastener.

Referring more particularly to the drawings, the improved fastener 5 is constructed of a single length of rod iron metal, and it has a substantially S-shaped hook 6 formed upon one end thereof and an eye 7 formed upon its opposite end. The hook 6, is adapted to have the outer bill 8 thereof, inserted through one of the links at the end A, of the anti-skid chain B, in connecting the end A of the chain to the other or co-acting free end C thereof, and in applying the improved fastener, the body 5 is inserted through the end link 9 of the end C of the chain, which link acts as a fulcrum as shown in Fig. 2 of the drawings, and the fastener 5 is then moved back along the rim of the wheel D into the position as illustrated in Fig. 1 of the drawings. After the rod 5 has been moved rearwardly a sufficient distance the link 9 will slide along the length of the rod and engage in the curve 10 of the S-shaped hook 6 formed at the junction of this S-shaped hook with the main link or body of the fastener. When the fastener is thus positioned the hook 11 of approved type of snap hook 12 is inserted through the eye 7 securely holding the fastener 5 in place. The snap hook 12 is permanently fastened to the chain A at a distance remote from the free end thereof and preferably to one side of a cross chain B of the anti-skid chain A as clearly shown in Fig. 1 of the drawings.

Changes in details may be made without departing from the spirit of this invention, or the scope of the subjoined claims but;

I claim:

1. In a fastener for anti-skid chains, the combination with an anti-skid chain, of a snap hook carried by the anti-skid chain, a rod, an eye, formed upon one end of said rod and adapted to be engaged by said snap hook, and means formed upon the end of the rod opposite said eye for engagement with the meeting end of an anti-skid chain to connect them.

2. As an article of manufacture, a fastener for anti-skid chains comprising a straight body portion of rigid material, an eye formed upon one end of said straight body portion, and an S-shaped hook upon the other end of said straight body portion.

3. In a device for anti-skid chains, the combination with a length of chain, of a straight and rigid rod having an S-shaped hook on one end thereof pivotally clamped at its end to a link upon one end of said chain, said rod adapted for insertion through a link upon the second end of said chain, for acting as a cam lever to draw said 1st and 2nd mentioned ends of the said chains together, said rod having an eye upon the other end thereof opposite said S-shaped hook; and a snap fastener pivotally clamped upon a link of said 2nd mentioned end of said chain, and adapted to receive said eye of the rod for maintaining said first and second mentioned ends of the chain together.

AUGUST H. RINGEN.